(12) United States Patent
Grimaud et al.

(10) Patent No.: US 7,490,333 B2
(45) Date of Patent: Feb. 10, 2009

(54) CAPABILITY-BASED ACCESS CONTROL FOR APPLICATIONS IN PARTICULAR CO-OPERATING APPLICATIONS IN A CHIP CARD

(75) Inventors: Gilles Grimaud, Lille (FR); Daniel Hagimont, Crolles (FR); Jean-Jacques Vandewalle, Marseilles (FR)

(73) Assignee: Gemalto SA, Gemenos (FR)

( * ) Notice: Subject to any disclaimer, the term of this patent is extended or adjusted under 35 U.S.C. 154(b) by 970 days.

(21) Appl. No.: 10/148,954

(22) PCT Filed: Dec. 8, 2000

(86) PCT No.: PCT/FR00/03463

§ 371 (c)(1),
(2), (4) Date: Oct. 15, 2002

(87) PCT Pub. No.: WO01/42887

PCT Pub. Date: Jun. 14, 2001

(65) Prior Publication Data

US 2003/0065982 A1    Apr. 3, 2003

(30) Foreign Application Priority Data

Dec. 10, 1999    (FR) .................................. 99 15791

(51) Int. Cl.
*G06F 13/00* (2006.01)

(52) U.S. Cl. .................... 719/316; 713/159; 713/167; 713/172; 713/185

(58) Field of Classification Search ................ 719/310, 719/316, 313, 331, 332; 713/159, 167, 172, 713/185

See application file for complete search history.

(56) References Cited

U.S. PATENT DOCUMENTS

| 5,781,633 | A |   | 7/1998 | Tribble et al. |
|-----------|---|---|--------|----------------|
| 5,911,143 | A | * | 6/1999 | Deinhart et al. .......... 707/103 R |
| 5,941,947 | A | * | 8/1999 | Brown et al. ................. 709/225 |
| 6,012,143 | A | * | 1/2000 | Tanaka ......................... 726/20 |
| 6,256,393 | B1 | * | 7/2001 | Safadi et al. ................. 380/232 |
| 6,289,458 | B1 | * | 9/2001 | Garg et al. ..................... 726/21 |
| 6,505,300 | B2 | * | 1/2003 | Chan et al. ................... 713/164 |
| 6,681,243 | B1 | * | 1/2004 | Putzolu et al. .............. 709/202 |
| 6,892,301 | B1 | * | 5/2005 | Hansmann et al. .......... 713/172 |

FOREIGN PATENT DOCUMENTS

WO    WO 98/19237    5/1998

* cited by examiner

*Primary Examiner*—Andy Ho
(74) *Attorney, Agent, or Firm*—Buchanan Ingersoll & Rooney, PC

(57) ABSTRACT

The invention relieves an application programmer of the responsibility for managing access rights, by providing application code that is independent of the protection in a chip card. When an application, for example in a docking station, is given access to an object pertaining to another application in a chip card, two capabilities are created respectively in the applications, as objects, to protect all subsequent accesses to the object by filtering them through the two capabilities. On accessing an object pertaining to an application, if a second object pertaining to the other application is passed on to the latter, two other capabilities are added in the applications to protect access to the second object.

13 Claims, 3 Drawing Sheets

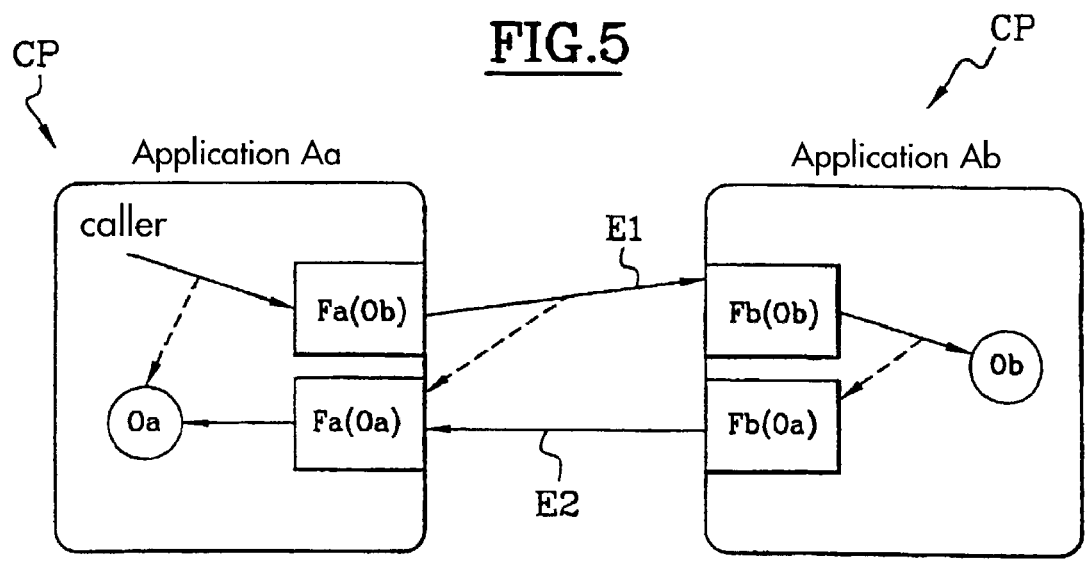
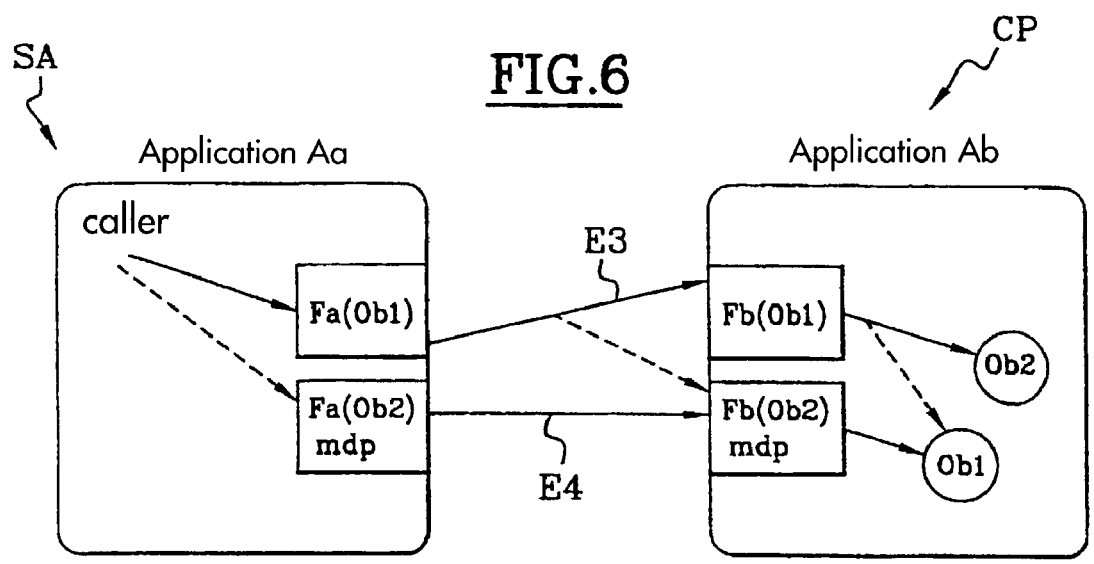

CAPABILITY-BASED ACCESS CONTROL FOR APPLICATIONS IN PARTICULAR CO-OPERATING APPLICATIONS IN A CHIP CARD

This disclosure is based upon French Application No. 99/15791, filed on Dec. 10, 1999 and International Application No. PCT/FR00/03463, filed Dec. 8, 2000, the contents of which are incorporated herein by reference.

BACKGROUND OF THE INVENTION

The invention relates to chip cards, also referred to as microcontroller cards or integrated circuit cards, and more generally open programmable data processing means able to be loaded with applications written in high-level programming languages.

An open chip card, as presented for example in the document WO 98/19237, manages several applications, for example a customer account for a shop, a bank account or an electronic purse. Some applications loaded in the card sometimes cooperate for example in order to pay for a purchase from the shop, and/or also cooperate with applications executed outside the card.

Cooperation of the applications makes it possible to establish access right rules, the applications not necessarily trusting each other. For example, the customer account managed by the shop must not appropriate data managed by the electronic purse.

In a data processing environment, management of the access control consists in associating rights of access with objects managed in the environment for each user, and checking that these access rights are complied with.

Management of the access control is shown schematically in FIG. 1 by the management of an access matrix MA. The rows in the matrix MA correspond to the rights of J objects O1 to OJ and the columns in this matrix correspond to the rights of I users U1 to UI. A box in the matrix at the intersection of a row and column gives access rights Dij of a user Ui to an object Oj, with $1=i=I$ and $1=j=J$, for example a right to read from, write to or execute a file.

In practice, the matrix MA is partially empty, users often having no right over many objects, and has one of the two configurations consisting of a grouping of the access rights by row and a grouping of access rights by column.

Grouping by row amounts to associating with each object Oj an access list indicating the access rights D1j to DIj over the object respectively for the users U1 to UI. In a management by lists of accesses respectively associated with objects, only the owner of an object Oj modifies the access list D1j to DIj associated with the object; such a modification takes place explicitly by invoking an operation on the object requiring the modification of its access list. The protection schemes based on access lists are then termed static, the modification of the access rights being complex and the users having a tendency to oversize the access rights of their objects. This runs counter to the principle of least privilege (known in English as the need to know principle) according to which access rights are granted only as needs occur.

Grouping by column associates with each user UI a list of capabilities indicating the access rights Di1 to DiJ of the user respectively for the objects over which the user has a right. Each element (Oj, Dij) in the list is called a capability. A capability is a descriptor containing the identification of an object Oj and a definition of access rights Dij over this object. In management by capabilities, a user has a list of capabilities, a capability being able to be compared with a token giving the right to carry out an operation on the object. A capability identifies an object, but also includes a definition of the rights of access over the object. A capability can then be utilised as an object identifier which an application can pass as a parameter to another application, following a conventional programming mode, with the limitation that this identifier does not enable all operations on the designated object.

The result is that the modification of the access rights is more natural with capabilities: granting to an application or a user access rights to an object amounts to passing to it as a parameter of an operation the identity of the object in the form of a capability.

Capabilities afford greater dynamics in the management of the access control, the access rights being able to be easily exchanged between the users of the environment. However, when a user or an application must pass as a parameter a capability on an object, the user or the application must decide in advance on the rights to be transferred with the capability. An operation makes it possible in general to reduce the rights associated with the capability if necessary, before passing it as a parameter.

In the prior art, hardware implementations and software implementations of the capabilities comparable to tokens are known. The first hardware implementations were based on specialist machines in the 1970s. The addressing mechanism of these machines directly established the concept of capability: an address register serving to address an object also contains the rights of access to the object (the register containing the token). The values of these registers could be exchanged between users, but could not be forged, the hardware not permitting this. The software implementations, more recent in the 1980s, were based on enciphering for the protection of the capabilities. A capability was signed and could be created only by the owner of the object.

Thus the document U.S. Pat. No. 5,781,633 illustrates a prior technique allowing filtering, by means of capabilities, of exchanges of object references between different processes. Cryptographic methods are used to guarantee mainly the integrity of the references exchanged. Cooperation between processes is achieved by the transmission of a reduced view of an object of a process, to a second process. The filter thus created is located within the process requesting access. In a context of the "mutually mistrusting process" type, the method disclosed by the document is inoperative. This is because the process requesting access may as it pleases modify the filter which was transmitted to it and thus access methods which are however prohibited to it.

SUMMARY OF THE INVENTION

The invention more particularly concerns an access control mechanism based on a protection scheme by capabilities for managing cooperation between applications in the context of a chip card. This is because the context of the chip card is characterised by cooperations between applications not provided for in advance. It is therefore difficult to satisfy a protection scheme such as access lists where the access rights are usually pre-established. The dynamics of the scheme based on capabilities is a real need.

In current solutions in the context of the chip card, a programmer must manage capabilities "in the hand" in the code of the application, which results in a complexity in programming the protected applications.

The invention establishes a capability model in the context of the chip card in order to pursue two objectives:

Preserving the programming simplicity of the JAVA language in the context of the JAVA card. To do this, the invention aims to make the code of the applications independent of the protection. The specification of the protection policy, that is to say the management of the capabilities, is separate from the code of the applications.

To allow cooperation between applications in the card, but also between applications in the card and applications outside the card. This makes it necessary to consider the operating system in the card as a secure environment and the outside of the card as a hostile environment.

Achieving these two objectives by means of the invention affords great simplicity in programming of the access control, which also reduces the cost of developing and maintaining the code, as well as the risks of error in programming the protection.

The first objective results in separating the development of the application and the management of the access rights, thus simplifying the complexity. The applications programmer programs applications without being concerned about the management of the access rights. The latter is specified separately in a simple and very intuitive formalism.

For the second objective, the invention offers a uniform model for managing access rights whilst the underlying constraints are very different when operating in the card or outside the card.

The two objectives respond to the same motivation consisting in masking the complexities inherent in the protection and in the card, and simplifying the programming of protected cooperating applications.

To achieve these objectives, the invention provides a method for generating applications characterised in that it comprises:
- a step of developing an application comprising an object or several objects, without restriction of access;
- a step of defining the rules for access rights to the object or objects, included within the application, from a second application or from several other applications;
- a step of transforming the application comprising the object or objects by adding to the said application means of filtering the accesses to the said object or to the said objects in order to implement an access control method ensuring the cooperation of the applications;
- a step of establishing the transformed application with a data processing means.

According to a first embodiment, the data processing means is included in a chip card.

In a second embodiment, the data processing means is included in a station accepting the chip card.

In addition, according to the invention, the method of access control between two applications each cooperating by means of capabilities on objects belonging to the other application, the applications cooperating through at least one operating system, is characterised by the following step:

when one of the applications, referred to as the access-requesting application, is given access to an object belonging to another application, referred to as the access-providing application;

creating two capabilities respectively in the said access-requesting and providing applications, as objects;

the capability created in the access-providing application for limiting access to the said object, and the capability created in the access-providing application for associating the access-requesting application with the capability created in the access-providing application.

According to another aspect of the invention, during access to an object belonging to one of the applications, if a second object belonging to one of the applications has passed to this application, the method comprises the step of adding two other capabilities respectively in the applications in order to protect access to the second object.

In practice, the capability for access to the second object belonging to one of the applications has passed as a parameter or as a result to the other application.

According to a first embodiment, the applications can be established in a common data processing means, for example in a chip card or a terminal. In the case of a chip card, the verifications of the code loaded in the chip card make it possible to ensure that a capability cannot be created by a pirate programmer.

According to a second embodiment, the applications are established in two distant data processing means exchanging messages for access to distant objects. The step of adding two other capabilities can then preferably comprise the storage of a secret word in the other two capabilities, passed to these by the two capabilities previously created at the creating step, in order to validate access to the second object.

The data processing means can be included respectively in a chip card and a station accepting the chip card, or in two distinct chip cards, or in two controllers of a chip card or of a terminal.

BRIEF DESCRIPTION OF THE DRAWINGS

Other characteristics and advantages of the present invention will emerge more clearly from a reading of the following description of several preferred embodiments of the invention with reference to the corresponding accompanying drawings, in which:

FIG. 1 shows a matrix of access rights, already commented on;

FIG. 5 is a block diagram showing the addition of two filters during the call by an application of the method to a first object in another application, according to a first embodiment of the method according to the invention; and FIG. 6 is a block diagram similar to FIG. 5, showing the addition of two filters during the call by an application in a station invoking the method on a first object in another application in a chip card, according to a second embodiment of the invention.

DESCRIPTION OF THE INVENTION

The general concept underlying the invention is the management of capabilities, that is to say the management of elementary access rights, separate from an application.

When two applications cooperate, this cooperation follows a pre-established cooperation protocol. This cooperation protocol generally takes the form of a common interface enabling the applications to call each other. More precisely, in the context of the JAVA card, each application which wishes to call another application does so using a JAVA interface which is the one which is deemed to be provided by the application called.

Figure 1:
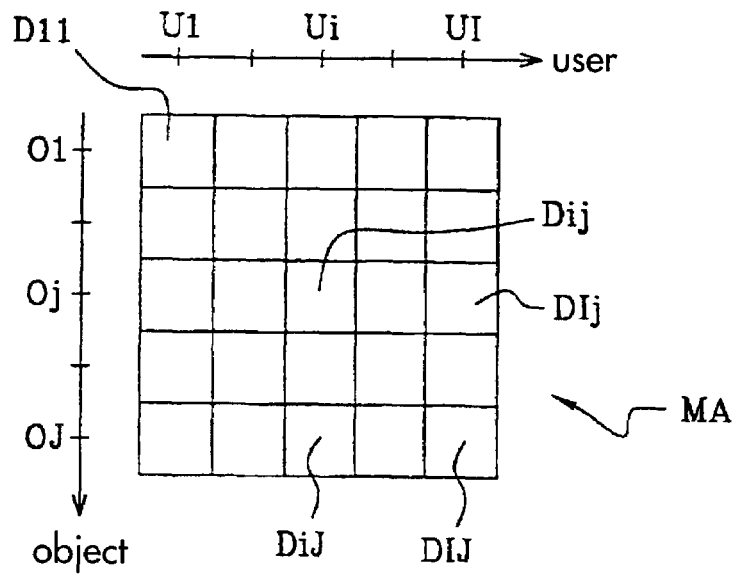
Figure 2:
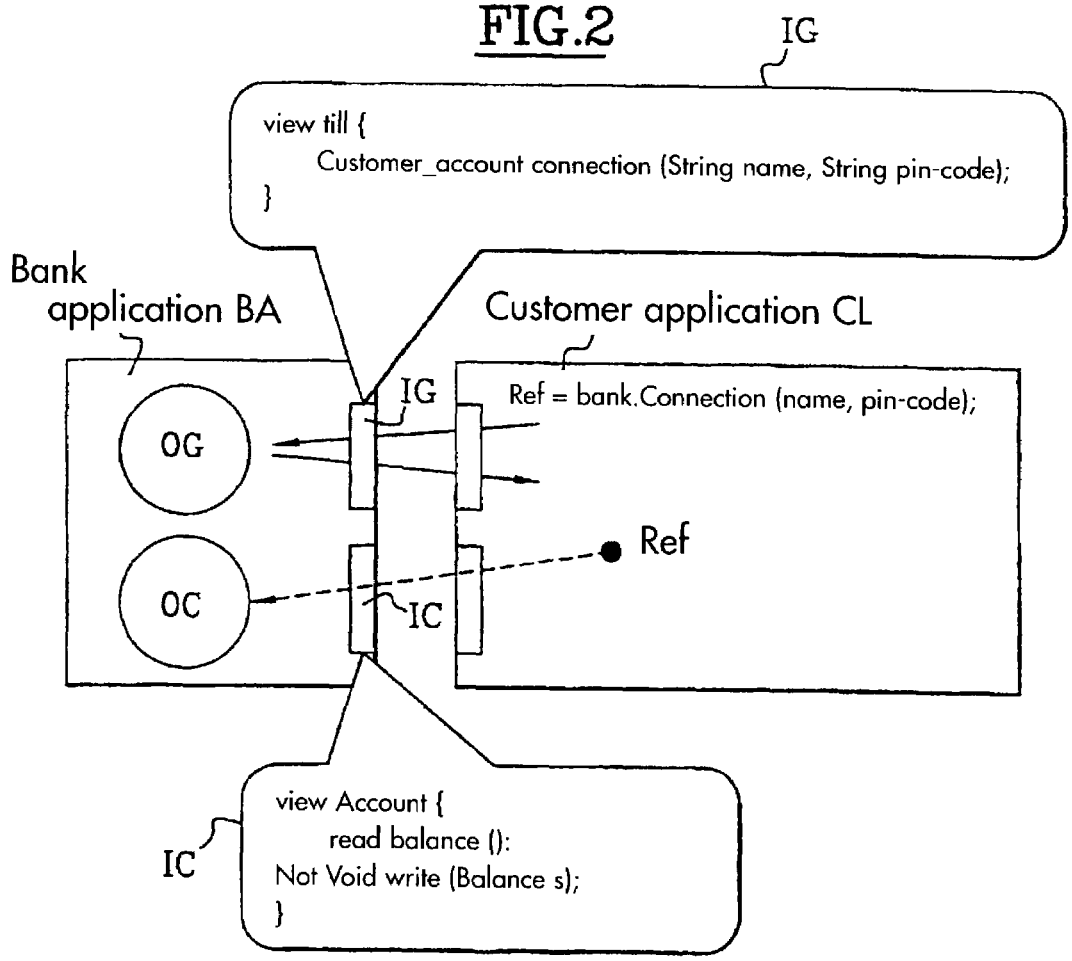
FIG. 2 is a block diagram showing interfaces between a bank application and a client application.

With reference to the example illustrated in FIG. 2, a bank BA, that is to say a bank application in a server, manages accounts for customers. When a customer CL connects to the bank through a Till object OG, the bank returns to him a reference Ref on its object Account in bank OC so that he can read the state of his account. Each of the bank and customer applications knows the cooperation interfaces IG and IC which are those of the Till and Account objects. The interface of the Till object IG enables the client to connect to the bank by giving his name and an access code, such as a personal identity code PIN (Personal Identity Number), and to return to it the reference Ref to the Account object OC. The interface of the Account object IC provides two methods respectively for reading and writing the balance of the account in the bank, the syntax used being that of the JAVA language.

The requirements in terms of protection in this example are presented below. The bank has all the rights over its own objects. However, it is unthinkable for the bank to grant all the rights to its customers. A customer can read the balance of his account in the bank, but must not be enabled to arbitrarily write the balance of his account. This is why, in a scheme of protection by capabilities, the bank returns, as a result of the connection operation, a capability corresponding to the reference on the Account object, but with rights which allow only the invocation of the account reading operation. The bank, which possesses all the rights over its own objects, including the Account object, creates a capability authorising only reading on this object and returns this capability to its customer.

Given that the first objective to which the invention relates is to separate the definition of the protection policy and the code of the application, the invention more particularly aims to provide rules for the exchanges of capability between the applications at the interfaces used for cooperating.

In the example shown in FIG. 2, the supply of the access control by programming is situated at the interface of the Till object OG of the bank BA. According to a first aspect of the invention, this programming tool specifies in the interfaces used the capability which it is necessary to transfer during a parameter transmission between applications. A "protected" interface called a view is obtained, which takes the following form in JAVA language, the word "String" designating a character string object:

```
till view {
    Customer_account connection {String name,
String pin-code);
}
    Customer_account view {
        Read balance ( );
        NOT void write (Balance s);
}
```

The specification of these two views indicates that the bank BA allows only capabilities making it possible to read the balance of the accounts to leave. The bank application and customer application code therefore remains completely independent of the protection.

Figure 3:
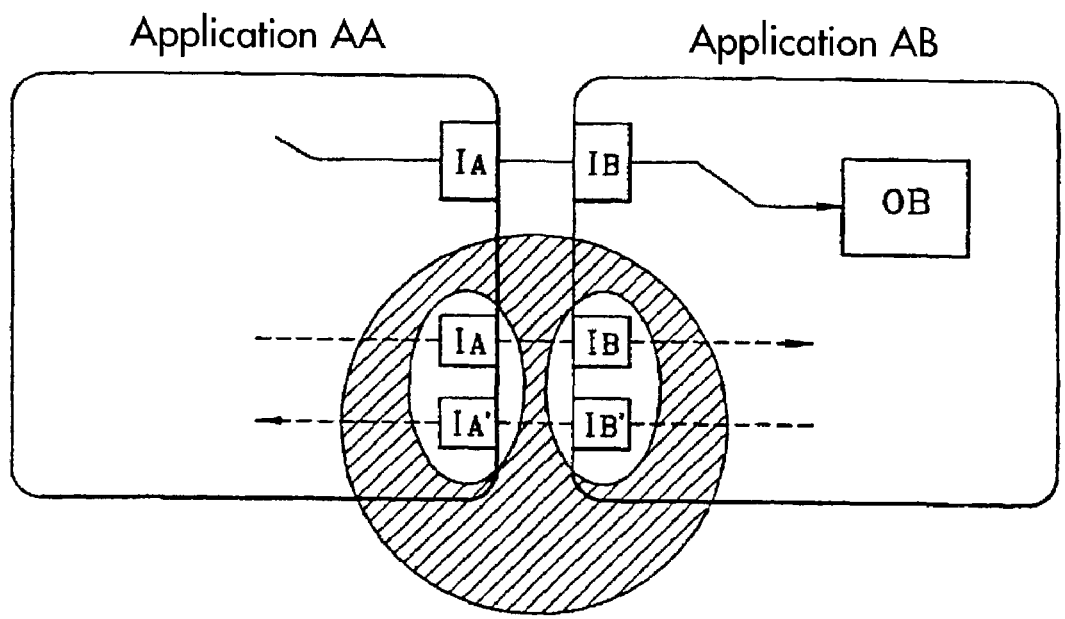
FIG. 3 is a block diagram showing interfaces of two cooperating applications according to the invention.

In more general terms, the programming tool enables each of the applications, the bank application and the personal application according to the previous example, to define its own protection rules. When an application AA has a capability to an object OB or an application AB as shown in FIG. 3, the capability includes the protection rules defined by the application AA and grouped together in a "view" protected interface IA and the protection rules defined by the application AB and grouped together in a "view" protected interface IB. View IB has two roles: limiting the methods which the application AA can invoke the object OB and associating the view chosen by the application AB with the capabilities entering in and leaving the application AB when the object OB is invoked. The view IA fulfils only the second role for the capabilities entering into and leaving the application AA.

Thus, for each capability exchanged as a parameter of the call from the application AA to the application AB, or from the application AB to the application AA, the view IA associates a view IA' with this capability and the view IB associates a view IB' with this capability.

Another aspect of the invention is the integration of the programming tool in the context of the chip card. In the context of an open chip card, applications are loaded in the card. These applications, known as internal applications, interact with each other, but also with applications, known as external applications, executed in an accepting station, such as a bank terminal, a point of sale or a mobile telephone terminal, in which the card is inserted. This involves capabilities being exchanged between internal applications and external applications. The programming tool associated with the invention is put in place whilst considering the following parts of this context related to the card and the accepting station:

The JAVA Card chip card is a protected environment in the sense that the JAVA code loaded in the chip card is checked before it is actually loaded. This check aims to ensure that the code to be loaded does indeed possess certain properties of the JAVA code, principally related to security. JAVA language does not make it possible to directly manipulate addresses and therefore to arbitrarily overwrite memory, which provides a certain degree of security when various programs are stored in the same virtual JAVA machine. The location of the protection scheme of the invention takes account of this context internal to the card for the location of the capabilities in the card.

The accepting station in which the card is inserted is not necessarily a protected environment. This is because the card may be inserted in any accepting station, and the accepting station may very well send fabricated data in order to deceive the card. When they are propagated outside the card, the capabilities are, according to the invention, protected by secrets which make it possible to verify the validity of the capabilities used by applications external to the card.

The invention thus relates to a programming tool for programming the management of the access rights between the cooperating applications executed in the chip card or in the accepting station. The definition of the access rights management rules is separate from the applications code, which confers greater clarity. The integration in the context of the JAVA Card chip card requires managing the capabilities differently in the chip card and outside it.

The programming tool associated with the invention specifies the rules for protecting an application separately from the code of the application.

It is assumed that a first application Aa written in JAVA language cooperates with a second application Ab also written in JAVA language through a cooperation interface Iab located in a single data processing means, for example a chip card with a specific operation system and the JAVA virtual machine:

```
interface Iab {
    void meth1 (I1 p1);
    I2 meth2 ( );
    void meth3 ( );
}
```

The interface Iab contains the definitions of three methods meth1, meth2 and meth3. The method meth1 takes as a parameter p1 a reference to an object of the interface type I1 and returns no result. The method meth2 takes no parameter and returns a result of the interface type I2. The method meth3 takes no parameter and returns no result.

Each application then specifies protection interfaces known as views, for example the following views Iab_V, I1_V1 and I2_V2:

```
view Iab_V{
    void meth1 (I1_V1 p1);
    I2_V2 meth2 ( );
    NOT void meth3 ( );
}
```

When the application Aa has a capability on an object belonging to the application Ab, the applications Aa and Ab have the possibility of specifying the protection to be associated with this capability by associating a view with this capability.

The view Iab_V indicates that only the methods meth1 and meth2 are enabled. It also indicates that, if the method meth1 is invoked, then the application, which may be an invoking application or an invoked application, protects itself by associating with the capability passed as a parameter the view I1_V1. Finally, it indicates that, if the method meth2 is invoked, then the application protects itself by associating the view I2_V2 with the capability passed as a result.

When the application Aa has a capability to an object of the application Ab, the view which the application Aa associates with this capability enables the application Aa to check the capabilities which enter and leave it, that is to say to associate a view with these capabilities. Conversely, the view which the application Ab associates with this capability enables the application Ab to check the capabilities which enter and leave it, but also to limit the methods which can be invoked on the object of the application Ab.

In general, the first exporting of an access capability from the application Ab to the other application Aa and the first importing of this capability by the other application Aa, passes through a name server. The application Ab exports the access capability by associating it with a symbolic name, such as a character string, and the application Aa imports the exported access capability by interrogating the name server with the symbolic name. The application Ab exports the capability by explicitly specifying the view which the application Ab associates therewith. The application Aa imports the exported capability by explicitly specifying the view which the application Aa associates therewith. For the application Aa as for the application Ab, the specific view indicates, for all the capability exchanges as a parameter resulting from this first exchange, the view which will be associated with these capabilities passed as a parameter.

As a result, except for this first access capability message exchange, the protection policy of each application according to the invention, that is to say the manner of exchanging the capabilities, is specified at the interfaces and is not embedded in the code of the application.

Figure 4:
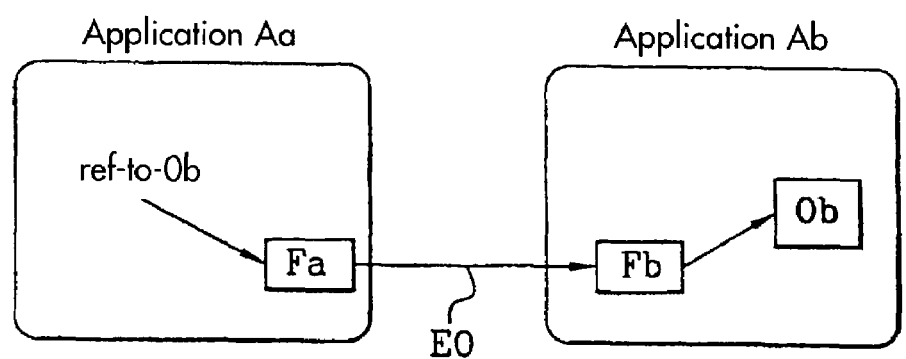
FIG. 4 is a block diagram showing the establishment of filtered objects between two cooperating applications at an initial step of the method according to the invention.

The establishment of the protection policy according to the invention is based on the concept of filter objects, "illustrating" capability objects (signifying aptitudes or abilities), which are inserted between the applications Aa and Ab. For each view defined by an application, a filter class is generated and an instance of this class is inserted at the execution in the access chain to an object whose capability is exported. As shown in FIG. 4, if at an initial step E0 access to an object Ob belonging to an application Ab is given to the application Aa, the view of the application Aa for the capability of this access is established by a filter Fa and the view of the application Ab for this capability is established by a filter Fb.

A filter class defines all the methods declared in the view which the filter establishes. Its role is to retransmit the method invocation to its successor in the access chain of the object. According to the example shown in FIG. 4, the filter Fa retransmits the core to the filter Fb and the filter Fb to the object Ob.

On the other hand, a filter class establishes the protection policy defined by the view from which it is generated: the filter Fb allows only the methods enabled by the view of the application Ab to pass; and the filters Fa and Fb also establish the association of the views with the capabilities passed as a parameter. According to the above example of views, the view Iab_V indicates the association of the view I1_V1 with the parameter p1 of the method meth1. The association of the view with the capability is established by inserting in the access chain to the object passed as a parameter a filter object corresponding to the view.

With reference to FIG. 5, for two applications Aa and Ab established in a chip card CP, the application Aa has at the initial step E0 a capability towards the object Ob of the application Ab, and as in FIG. 4, the subsequent accesses to the object Ob are protected by the filter Fa(Ob) of the application Aa and by the filter Fb(Ob) of the application Ab. At a first step E1, during the invocation by the application Aa of the method meth1 on the object Ob belonging to the application Ab, that is to say during access to the object Ob, a capability on an object Oa belonging to the application Aa is passed as a parameter to the other application Ab. In order to implement the protection specified by the application Aa in its view at a second step E2, the filter Fa(Ob) adds the filter Fa(Oa) and passes is as a parameter of the method meth1 in place of the direct reference to the object Oa. Likewise, to implement the protection specified by the application Ab in its view, the filter Fb(Ob) adds the filter Fb(Oa) and passes it as a parameter of method meth1 in place of the parameter received.

The filter objects Fa(Ob) and Fb(Ob), when they are invoked, are therefore responsible for installing filter objects Fa(Oa) and Fb(Oa) for the references passed as a parameter; in other words, two capabilities illustrated by the filters Fa(Oa) and Fb(Oa) protecting access to the object Oa are added respectively in the applications Aa and Ab.

There is indicated below an example of a filter class F_Iab_V generated for the view Iab_V given previously, stated below:

```
view Iab_V {
    void meth1 (I1_V1 p1);
    I2_V2 meth2 ( );
    NOT void meth3 ( );
}
```

For the views I1_V1 and I2_V2 there are created respectively filter classes F_I1_V1 and F_I2_V2. It is assumed that the two applications Aa and Ab which cooperate are situated in the same JAVA environment and the following lines are also written in JAVA code, in which the key word public signifies that the following declared method is accessible for all classes, the key word void signifies that the following declared method, once executed, returns no result, and the key word new designates a class creation operation:

```
public class F__Iab__V implements Iab {
    Iab obj;
    public F__Iab__V (Iab o) {
        obj = o;
    }
    public void meth1 (I1__V1 p1) {
        obj.meth1 (new F__I1__V1 (p1));
    }
    public I2__V2 meth2 ( ) {
        return (new F__I2__V2 (obj.methd2( )));
    }
    public void meth3 ( ){
        // propagate an exception
    }
}
```

The variable obj is a reference to the following entity in the access path to the object, the second filter or the real object. It is used to retransmit the call if it is authorised.

The method F_Iab_V is the constructor method of the filter class. It initialises the variable obj. When the application Aa imports a capability of the name server and wishes to associate with it the view Iab_V, it invokes the constructor method whilst passing to it as a parameter the JAVA reference received.

The method meth1 retransmits a call which is therefore authorised, but it must associate with the capability passed as a parameter p1 the view I1_V1. The method meth1 creates by the operator new a filter F_I1_V1 from the parameter received, and then retransmits the call by passing as a parameter p1 the reference to the created filter.

The method meth2 retransmits the call and receives a capability in return. It has to associate therewith the view I2_V2. The method meth2 therefore creates an instance of the class F_I2_V2 from the received parameter and returns, by means of the instruction return, the reference to the filter object created in return for the method meth2.

The method meth3 does not retransmit the call since it is not authorised, and therefore propagates an exception.

The establishment when the cooperating applications Aa and Ab are both in the chip card complies with the principles described above. On the other hand, when one of the two applications is outside the card, the establishment is substantially different.

The invocations of methods between an accepting station SA, such as a terminal, and a chip card CP as shown schematically in FIG. 6 are established from messages, called application protocol data units APDU, between the accepting station SA and the chip card CP, these method calls being effected only in the direction from accepting station to the card. This is because the accepting station and the chip card, or as a variant two chip cards or two controllers and a chip card or a terminal, comprise microcontrollers constituting data processing means which are respectively master and slave and which dialogue according to an asynchronous data exchange protocol which obliges the accepting station to periodically interrogate the card so that the latter triggers in response an action in the accepting station.

As a variant, the accepting station is hereinafter replaced by another chip card, that is to say the cooperating applications Aa and Ab are established respectively in two chip cards, or more generally in two controllers.

The asynchronous data exchange protocol means that, for a call relating to an object Ob1 from the application Aa in the accepting station SA to the application Ab in the card CP to which the object Ob1 belongs, when there is retransmission of a call between two filter objects Fa(Ob1) and Fb(Ob1), relating to the object Ob1, this retransmission of the call takes the form of a message exchange between the accepting station and the card. An accepting station of unknown origin (a pirate) is then capable of establishing a message corresponding to a method call although it is not actually authorised to make this method call. This amounts to creating a capability, which is not possible in the protection scheme according to the invention.

In order to protect the capabilities against these attacks, secrets, such as passwords mdp, possibly based on enciphering methods, are used.

As shown in FIG. 6, when at a first step E3 the application Aa in the accepting station SA invokes the method meth2 on an object Ob1 belonging to the other application Ab in the card CP, that is to say during access to the object Ob1, and when at a second step E4 the result of this method invocation returns an access capability on an object Ob2 belonging to the application Ab, the filter Fb(Ob1) creates the filter Fb(Ob2) in the operating system of the card CP for this access capability. According to the invention, the filter Fb(Ob1) then generates a secret, such as a password mdp, which is stored in the filter Fb(Ob2) and returned to the filter Fa(Ob1), which also stores it. Thus, when the filter Fa(Ob1) creates the filter Fa(Ob2) in the accepting station SA for the returned access capability, the filter Fa(Ob1) passes to the filter Fa(Ob2) the password mdp which is stored therein. In other words, access to the object Ob2 is protected in the applications Aa and Ab respectively by two added capabilities illustrated by the filters Fa(Ob2) and Fb(Ob2).

When at step E4 this capability returned as a parameter is used to invoke a method on the object Ob2, the call between the filters Fa(Ob2) and Fb(Ob2) includes the password in the message APDU, which enables the filter Fb(Ob2) to check that the access capability to the object Ob2 is valid.

The invention thus creates by naming a correspondence between an object and a capability illustrated by a filter, managed by the operating systems in the data processing means, such as an accepting station and chip card. If an object is omitted in an application, the respective operating system destroys the corresponding filter.

Thus the cooperation between an application Ab in the card with any application requires managing capabilities which may take two formats, with a password if the application of any nature is exported from the card and without a password if it remains in the card.

The above protection scheme uses references, kinds of pointers, to JAVA objects which are almost capabilities. This is because, given that JAVA language is secure, it is not possible in a JAVA program to establish a reference to an object and to invoke a method on this object. This implies that, if an object O1 creates an object O2, the object O2 is not accessible from the other objects in the JAVA environment, as long as the object O1 does not explicitly transmit to the object O2 a reference to these other objects. This reference transmission can take place only by the passing of a parameter when an object invokes the object O1 or when the object O1 invokes another object.

The invention claimed is:

1. A method for controlling access between two applications each cooperating by means of capabilities on objects belonging to the other application, the applications cooperating through at least one operating system and being established in a data processing means, comprising the following step:

when one of the applications, known as the access-requesting application, is given access to an object belonging to another application, known as the access-providing application, creating two capabilities respectively in said access-requesting and providing applications, as objects;

wherein the capability created in the access-providing application limits access to said object and, the capability created in the access-requesting application associates the access-requesting application with the capability created in the access-providing application.

2. A method according to claim 1, wherein, during access to an object belonging to one of the applications, if a second object belonging to one of the applications is passed to one of the applications, performing the further step of adding two other capabilities respectively in the applications for protecting access to the second object.

3. A method according to claim 2, wherein the capability for access to the second object belonging to one of the applications is passed as a parameter or as a result to the other application.

4. A method according to claim 1 including the steps of exporting a capability from one application to the other application by associating it with a symbolic name, and importing the exported access capability in the other application by interrogating a name server with the symbolic name.

5. A method according to claim 1, wherein the applications are established in a common data processing means.

6. A method according to claim 1, wherein the applications are established in two distinct data processing means exchanging messages for access to distant objects.

7. A method according to claim 2, wherein the applications are established in two distinct data processing means exchanging messages for access to distant objects.

8. A method according to claim 7, wherein the step of adding two other capabilities comprises the storage of a secret word in the other two capabilities that is passed to said other two capabilities by the two previously created capabilities.

9. A method according to claim 6 wherein the data processing means are included respectively in a chip card and a station accepting the chip card.

10. A method according to claim 6 wherein the data processing means are included respectively in two chip cards.

11. An application generating method, comprising the following steps:

developing an application comprising at least one object, without restriction on access;

defining rules on rights of access to the object included within the application from a second application;

transforming the application comprising the object by adding to said application means of filtering the accesses to said object and;

establishing the transformed application within a data processing means.

12. A method according to claim 11 wherein the data processing means is included in a chip card.

13. A method according to claim 11, wherein the data processing means is included in a station accepting the chip card.

* * * * *